ns
United States
Wu

[11] 3,713,879
[45] Jan. 30, 1973

[54] FLAME RETARDANT FIBROUS MATERIAL

[75] Inventor: Chisung Wu, North Brunswick, N.J.

[73] Assignee: Union Carbide Corporation, New York, N.Y.

[22] Filed: May 18, 1970

[21] Appl. No.: 38,585

Related U.S. Application Data

[63] Continuation-in-part of Ser. No. 859,181, Sept. 18, 1969, abandoned.

[52] U.S. Cl. ............... 117/136, 8/116 P, 8/116.2, 8/116.3, 8/127.6, 8/128, 117/139.4, 117/143, 117/145, 117/148, 106/15 FP, 106/177
[51] Int. Cl. ... C09k 3/28, D06m 13/28, D06m 13/40
[58] Field of Search ........... 8/116 P, 116.2; 117/136; 106/15 FP, 177

[56] References Cited

UNITED STATES PATENTS

| | | | |
|---|---|---|---|
| 2,809,941 | 10/1957 | Reeves et al. | 117/136 X |
| 2,810,701 | 10/1957 | Reeves et al. | 8/116.2 X |

*Primary Examiner*—George F. Lesmes
*Assistant Examiner*—Harold Wolman
*Attorney*—Paul A. Rose, Clement J. Vicari and Aldo John Cozzi

[57] ABSTRACT

A fibrous material containing a flame retardant amount of the product produced by reacting (a) elemental phosphorus, (b) ethylene oxide, propylene oxide, 1,2-butylene oxide, or 1,2-epoxytetradecane and (c) an alcohol selected from the group consisting of propylene glycol, methanol, ethanol, propanol, butanol, dodecanol, and N,N-dimethylethanolamine; in the presence of a base catalyst selected from the group consisting of alkali metal alkoxide and a quaternary ammonium compound formed by interaction of reactant (b) and an N,N-dimethylamine; to produce an organophosphorus composition, and thereafter reacting said organophosphorus composition, with formaldehyde in proportions, at a temperature, and for a period of time sufficient to convert substantially all phosphinous hydrogen in said organophosphorus composition to hydroxymethyl groups.

20 Claims, No Drawings

FLAME RETARDANT FIBROUS MATERIAL

This application is a continuation-in-part of application Ser. No. 859,181, filed September 18, 1969 now abandoned. Application Ser. No. 859,181 was in turn a divisional of application Ser. No. 527,492 filed Feb. 15, 1966, which was subsequently abandoned in favor of continuation in part application Ser. No. 886,037 filed Dec. 17, 1969, application Ser. No. 886,037 matured into U.S. Pat. No. 3,644,595 on Feb. 22, 1972.

The invention relates to a process for producing organophosphorus compositions, to the compositions produced by said process, and to various derivatives thereof. In one aspect, the invention relates to a process which comprises reacting elemental phosphorus, an alcohol or mercaptan, and an epoxide or episulfide, in the presence of a basic catalyst. In another aspect, the invention relates to the organophosphorus compositions that are produced by the process of the invention, and to various derivatives thereof.

The process of the invention comprises reacting elemental phosphorus with an alcohol or mercaptan and an epoxide or episulfide in the presence of a basic catalyst to produce thereby an organophosphorus composition.

Elemental phosphorus is employed in the invention. White or yellow phosphorus is preferred, although the less reactive red or black phosphorus can be used if desired.

The second reactant that is employed is an alcohol or a mercaptan. Any alcohol or mercaptan that is free of substituents that can destroy or deactivate the base catalyst under the reaction conditions employed can be used in the invention. Thus, the following classes of alcohols and mercaptans can be employed in the invention:

Hydroxyl- and mercapto-substituted alkanes and cycloalkanes such as methanol, ethanol, isopropyl alcohol, n-butanol, pentanol, hexanol, cyclopentanol, cyclohexanol, 2-ethylhexanol, isodecanol, lauryl alcohol, stearyl alcohol, ethylene glycol, propylene glycol, butylene glycol, glycerol, 1,2,6-hexanetriol, pentaerythritol, xylitol, sorbitol, 1,1,1-trimethylolethane, 1,1,1-trimethylolpropane, methyl mercaptan, butyl mercaptan, 1,2-dithiol-3-hydroxypropane, and the like.

A second desirable class of alcohols are the hydroxyethers including alkylene oxide adducts of active hydrogen-containing compounds. Illustrative of such alkylene oxide adducts are diethylene glycol, triethylene glycol, dipropylene glycol, dibutylene glycol, polyoxypropylene glycols, polyoxyethylene glycols, mixed polyoxyethylene-polyoxypropylene glycols, polyoxybutylene glycols including polytetramethyleneoxy glycols, propylene oxide adducts of glycerol, and other ethylene oxide, propylene oxide, or butylene oxide adducts of water, methanol, ethanol, isopropyl alcohol, n-butanol, phenol and alkylphenols, ethylene glycol, propylene glycol, butylene glycol, hydroquinone, glycerol, pentaerythritol, ammonia, alkanolamines, alkylamines, aniline, adipic acid, phthalic acid, and the like. The hydroxyethers are organic compounds having at least one alcoholic hydroxyl group and at least one ether group, and which preferably contain no non-hydrocarbon substituents other than ether oxygen, hydroxyl groups, amino groups (usually tertiary amino groups), carbonyl groups, and carbonyloxy groups. The hydroxyether can be a composition having a very high molecular weight, for instance, up to about 10,000 or more, although preferably the molecular weight will be below about 5,000 and more preferably below about 3,500.

A third desirable class of alcohols are aminoalcohols. Illustrative of such alcohols are triethanolamine, triisopropanolamine, tributanolamine, N-methyldiethanolamine, N,N-dimethylethanolamine, N-methyldiisopropanolamine, N,N-dimethylisopropanolamine, N-ethyldiethanolamine, N-phenyldiethanolamine, and the like. The preferred aminoalcohols are the N-methyldialkanolamines and the N,N-dimethylalkanolamines.

In addition, many other alcohols can be employed including alcohols that contain olefinic unsaturation such as allyl alcohol, oleyl alcohol, linoleyl alcohol, linolenyl alcohol, and the like. The alcohol that is employed can thus be selected from many classes of compounds provided that the alcohol is substantially free of groups that would interfere with the reaction. Such groups to be avoided include carboxylic acid groups, phenolic hydroxyl, halo, and others that would neutralize or substantially weaken the basic catalyst.

The third reactant that is employed in the process of the invention is an epoxide or an episulfide. Epoxyalkanes are particularly useful, illustrative examples of which include ethylene oxide, propylene oxide, butylene oxide, epoxyhexane, epoxycyclohexane, epoxydecane, and the like. Also, epithioalkanes are useful, for example, ethylene sulfide, propylene sulfide, and the like, can be employed.

Epoxyalcohols can be employed in the process of the invention as the sole reactant with the elemental phosphorus, thereby supplying the epoxy and the alcohol function in a single compound. Among the useful epoxyalcohols that can be employed are 4-oxatetracyclo[$6.2.1.0^{2,7}.0^{3,5}$]undecan-9(10)-ol, glycidol, and the like.

Other types of epoxides can be employed in the invention, including polyepoxides, aminoepoxides, epoxides containing olefinic unsaturation, ester groups, ether groups, and the like. Specific illustrative examples include vinylcyclohexene dioxide, vinylcyclohexene monoxide, N-glycidyl diethylamine, epoxidized soybean oil and other such oils, the diglycidyl diether of 2,2-bis(para-hydroxyphenyl)propane, 3,4-epoxycyclohexy methyl 3,4-epoxycyclohexanecarboxylate, bis(2,3-epoxycyclopentyl) ether, and the like.

The alkylene oxides (i.e., epoxyalkanes) are the preferred epoxides, although for certain specialty applications other epoxides are highly useful.

The proportion of the reactants can vary widely. For example, the proportion of epoxide plus alcohol to phosphorus can vary from about 0.1 to about 10, and preferably from about 0.3 to about 3, gram-equivalents of epoxide plus alcohol per gram-atom of phosphorus. The radio of alcohol to epoxide can vary widely, for example, from about 0.1 to about 10, and preferably from about 0.3 to about 3, equivalents of alcohol per equivalent of epoxide.

A base catalyst is employed in the invention. Alkali metal and alkaline earth metal bases are useful. Examples include sodium hydroxide, potassium hydroxide, lithium hydroxide, calcium hydroxide, magnesium hydroxide, barium hydroxide, sodium metal, potassium metal (the alkali metals will form alkali metal alcoholates in situ), potassium carbonate, sodium ethoxide, magnesium methoxide, and the like. Of the alkali and alkaline earth metal base catalysts, the preferred are the alkali metal alcoholates formed in situ by reaction of alkali metal with the alcohol reactant. Quaternary ammonium bases are highly desirable catalysts for use in the invention. Quaternary ammonium bases can be generated in situ by the interaction of an N,N-dimethylamine and an epoxide, as is illustrated by the quaternary ammonium compound formed by the reaction of N,N-dimethylamine or N,N-dimethylethanolamine with ethylene oxide or propylene oxide. Other useful quaternary ammonium bases include trimethyl-2-hydroxyethyl ammonium hydroxide or alkoxides (which are formed by reaction of aqueous or alcoholic trimethylamine with ethylene oxide), trimethylbenzyl ammonium hydroxide or alkoxide, and the like.

The base catalyst is employed in catalytically significant quantities. The actual amount can vary widely since the catalyst can be employed in very small amounts or the catalyst can actually be one of the reactants. Thus, the catalyst can be employed in amounts of from about 0.01 mole per cent to about 10 mole per cent, and more preferably from about 0.1 to 6 mole per cent, based on gram-atoms of phosphorus present in the reaction mixture.

The process of the invention is carried out by contacting the reactants in a suitable reaction vessel. The order of addition is not critical. The reaction temperature can vary widely, for instance, elevated temperatures of from about 25°C. to about 200°C. are suitable, and temperatures of from about 44°C. (the melting point of white phosphorus) to about 150°C. are preferred. The reaction is carried out for a period of time sufficient to produce an organophosphorus composition. For instance, reaction times of from about 10 minutes to about 10 hours are suitable, depending upon temperature, nature of the reactants, and the like. If desired, an inert organic diluent can be employed for the reaction. Suitable diluents include toluene, methyl isobutyl ketone, dioxane, dimethyl sulfoxide, N,N-dimethylformamide, and the like. It is usually desirable to blanket the reaction mixture with an inert atmosphere such as nitrogen.

Standard procedures can be employed to recover the product. For instance, a convenient method is to first neutralize the catalyst, then filter and evaporate the product under vacuum to remove unreacted starting material, solvents, and the like.

The invention also provides novel organophosphorus compositions that are produced by the process of the invention. The novel compositions are usually mixtures of compounds that can be represented by Formula I:

$$(RX)_{3-n}P(R^1)_n$$

wherein $n$ is a number having a value of from 1 to 2, wherein X is oxy or thio, wherein R represents the residue after removal of the hydroxyl group of an alcohol or the sulfhydryl group of a mercaptan, and wherein $R^1$ represents hydrogen, $-R^2XH$ or $-R^2XP(R^1)_m(XR)_{2-m}$ wherein $m$ represents a number having a value of from 0 to 2, wherein $R^2$ represents the residue after removal of the epoxy group of an epoxide, and wherein X, R, and $R^1$ are as defined above. The compounds represented by Formula I can be relatively simple compounds having only one or two phosphorus atoms, or they can be relatively high molecular weight materials having up to ten or more phosphorus atoms.

Representative examples of organophosphorus compositions that are within the scope of Formula I are the following:

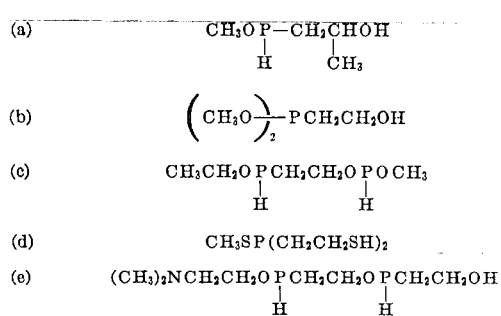

Formula I includes the organophosphorus compositions formed by reacting elemental phosphorus with a monohydric alcohol and a monoepoxide. More complex compositions can be formed when polyhydric alcohols and/or polyepoxides are employed. For example, among the compounds that can be formed by reacting an alkylene or polyalkylene glycol, phosphorus, and an alkylene oxide are the following:

(this compound is within the scope of Formula I)

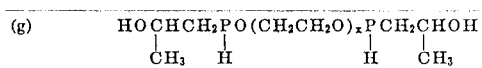

wherein $x$ is 1 or more.

The complex nature of the organophosphorus compositions of the invention is apparent from the foregoing discussion. Said compositions contain P-H, P-C, and P-X-C groupings in varying proportions that depend to a limited extent, on the proportion of the reactants. For instance, a greater proportion of epoxide or episulfide compared with alcohol or mercaptan will generally increase the proportion of P-C groups over P-X-C groups. A relatively large proportion of alcohol or mercaptan in the reaction mixture will result in an increase in P-H groups.

The organophosphorus compositions of the invention are useful materials, particularly as reaction intermediates. For example, the compositions can be oxidized under mild conditions to convert the P-H groups to P(O)OH groups which can be neutralized with alkylene oxide to form a useful polyol. Such polyols can be employed as epoxy resin hardeners, as coating intermediates after esterification with drying oil acids, and the like.

In one desirable embodiment of the invention, the organophosphorus compositions described above are reacted with an aldehyde in order to convert substantially all of the phosphinous hydrogen (i.e., hydrogen bonded directly to phosphorus) to hydroxymethyl (including substituted hydroxymethyl) groups. Many aliphatic and aromatic aldehydes can be employed for this purpose including formaldehyde, acetaldehyde, propionaldehyde, isobutyraldehyde, benzaldehyde, and the like. Formaldehyde is highly preferred. The aldehyde addition reaction is carried out simply by adding the aldehyde to the organophosphorus compositions and contacting until substantially all of the phosphinous hydrogen has been converted to hydroxymethyl groups in accordance with the reaction:

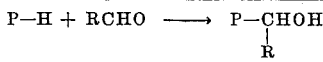

wherein R represents hydrogen or an aliphatic or aromatic group. This reaction, which is usually exothermic, will take place at room temperature, although higher or lower temperatures (for example, from 20° C. to the boiling point of the aldehyde) can be employed if desired. At room temperature, the aldehyde addition reaction usually takes from about 0.1 to about 6 hours, after which the product can be recovered by vacuum evaporation of excess aldehyde. The aldehyde is preferably employed in proportions slightly in excess of the amount needed to react with all of the phosphinous hydrogen. The aldehyde-modified composition can subsequently be oxidized (under mild conditions such as by warming in air) to convert the organophosphorus groups to organophosphorus oxide groups, e.g., in accordance with the reaction:

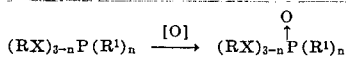

wherein the variables are as identified above with respect to Formula I (modified to the extent that phosphinous hydrogen is replaced with hydroxymethyl). Such oxidation has the effect of converting trivalent phosphorus to pentavalent phosphorus.

The reaction of aldehyde with phosphinous hydrogen to form hydroxymethyl groups and the oxidation reaction discussed above are both well known types of reactions.

The aldehyde-modified compositions per se and their oxidized derivatives are polyols having wide utility. For instance, these polyols can be modified by adding ethylene oxide to form useful surfactants, they can be employed as epoxy resin hardeners, they can be esterified with drying oil acids to form surface coating compositions, and the like.

Another desirable embodiment of the invention resides in the reaction of the organophosphorus compositions of the invention with an active olefin. An activated olefin will add to the P-H group, as is illustrated by the reaction:

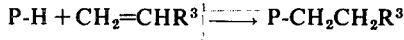

wherein $R^3$ represents a strongly electronegative group. Examples of activated olefins include acrylonitrile, acrylamide, methyl acrylate, t-butyl methacrylate, vinyl methyl ketone, vinyl methyl sulfone, and the like. The reaction conditions employed for the addition of activated olefin are essentially the same as those used for the aldehyde addition. The reaction is usually exothermic and requires no catalysts.

The compositions to which an activated olefin have been added can be oxidized under essentially the same conditions indicated above with respect to the aldehyde-modified materials.

The activated olefin-modified compositions (both per se and the oxidized derivatives thereof) are widely useful materials. They can be employed as flame-retardant additives for various polymeric systems including phenolic and epoxy resins. They are useful as anti-static agents for thermoplastic polymers, as oil additives, as sequestrants, and the like.

A further desirable embodiment of the invention resides in urethane polymers produced by reacting an organic polyisocyanate with a polyol comprising the organophosphorus compositions of the invention and/or the various derivatives thereof, in particular, the aldehyde-modified compositions.

The organic polyisocyanates which can be employed to produce the urethane polymers include tolylene diisocyanate, bis(4-isocyanatophenyl)methane, the polyisocyanates formed by phosgenation of aniline/formaldehyde condensation products, bis(2-isocyanatoethyl) fumarate, xylylene diisocyanate, and many other organic polyisocyanates that are well known in the art.

It may be desired to employ one or more additional polyols along with the phosphorus-containing polyols of the invention. Such additional polyols include polyesters, polyethers, polylactones and the like. Specific illustrative examples include polyethers comprising alkylene oxide (especially ethylene oxide, propylene oxide, or butylene oxide) adducts of glycerol, water, dipropylene glycol, ammonia, 1,2,6-hexanetriol, 1,1,1-trimethylolpropane, sorbitol, alpha-methyl glucoside, sucrose, aniline-formaldehyde condensation products, phenol-aniline-formaldehyde condensation products, and the like. Useful polyesters include reaction products of ethylene glycol, propylene glycol, glycerol, 1,1,1-trimethylolpropane, or the like with adipic acid, phthalic acid, or the like. Lactone polymers include homopolymers of epsilon-caprolactone and copolymers of alkylene oxides and epsilon-caprolactone, and the like.

The polyol or polyol mixture employed will be selected according to the end product desired. For example, for flexible foams, a polyol having an average hydroxyl number of from about 40 to 70 is desired, for semi-flexible foams or for rigid foams, polyols having average hydroxyl numbers of from about 70 to 150 or from about 125 to 7,000, respectively, are useful.

The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = 56.1 \times 1,000 \times f/m.w.$$

where OH = hydroxyl number of the polyol
f = average functionality, that is average number of hydroxyl groups per molecule of polyol
m.w. = average molecular weight of the polyol The urethane polymers of the invention can take the form of foamed products, elastomers, surface coatings, castings and the like. The foamed products can be produced by the one-shot technique wherein all of the reactants are reacted simultaneously with the foaming operation, by the prepolymer technique, or by the quasi-prepolymer technique, all of which are well known in the art. In producing elastomers and castings, the prepolymer technique is useful. In the prepolymer technique, the isocyanate is reacted with a slightly less than stoichiometric quantity of polyol to produce a prepolymer having a low percentage (e.g., from 4 to 10 per cent) of free —NCO groups. The prepolymer is subsequently converted into an elastomer by reacting with a cross-linking agent having reactive hydrogen atoms such as a diamine, for instance, a bis(aminochlorophenyl)-methane. In producing surface coatings, there are several types of known reaction techniques which can be employed.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ration of about 1.0 to 1.2 equivalents of —NCO per equivalent of active hydrogen, and preferably a ratio of about 1.05 to 1.1 equivalents to —NCO per reactive hydrogen.

When foams are being produced, foaming can be accomplished by employing a small amount of water in the reaction mixture (for example, from about 0.5 to 5 weight per cent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbon which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, and the like.

The amount of blowing agent used will vary with the density desired in the foamed product. In general it may be stated that for 100 grams of reaction mixture containing an average isocyanate/reactive hydrogen ratio of about 1:1, about 0.005 to 0.3 moles of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N,N,N',N'-tetramethyl-1,3-butanediamine, 1,4-diazabicyclo[2.2.2]octane, bis[2-(N,N-dimethylamino)ethyl] ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate (in making flexible foams) or dibutyltin dilaurate (in making rigid foams). The catalyst is employed in catalytic amount such as from about 0.05 weight per cent to about 6 weight per cent, based on weight of polyol.

When producing urethane foams, it is useful in most cases to employ a surfactant which serves as a stabilizer in making flexible foams and as a cell size regulator in making rigid foams. Polysiloxane-polyoxyalkylene block copolymers are useful surfactants for this purpose. Among the polysiloxane-polyoxyalkylene block copolymers that are useful are those that are disclosed in U. S. Pat. Nos. 2,834,748 and 2,917,480 (Bailey et al.) and 2,846,458 (Haluska). The surfactant is normally employed in amounts of from about 0.01 to about 2 weight per cent, based on weight of polyol.

An excellent summary of urethane polymer chemistry and technology is found in the text by Saunder and Frisch, "Polyurethanes:Chemistry and Technology," Interscience Publishers, New York, Part I, "Chemistry," was published in 1963 and Part II, "Technology," in 1964.

The urethane polymers of the invention have wide utility. For instance, they can be employed as elastomers, rigid and flexible foams, coatings, and the like. The wide utility as gaskets, sealers, in insulation, cushions and padding, in paints, and the like, of such urethane polymers is well known.

The Examples which follow illustrate the invention.

EXAMPLE 1

Potassium Alkoxide Catalyzed Reaction of Phosphorus with Propylene Oxide and Propylene Glycol To a 500-ml. four-necked flask equipped with a stirrer, thermometer, Dry Ice-acetone condenser, and a dropped funnel were charged 6.2 gm. of yellow phosphorus and 70 gm. of propylene glycol. The mixture was heated to 50° C under a nitrogen atmosphere, and then cooled gradually with vigorous agitation to prepare phosphorus sand. To the mixture was added 35 gm. of propylene oxide, and 0.24 gm. of potassium dissolved in 12 gm. of propylene glycol. After heating for 5 hours at 35°–50° C., the phosphorus was consumed completely, leaving a viscous, colorless liquid having a phosphine odor.

EXAMPLE 2–12

Potassium Alkoxide Catalyzed Reaction of Phosphorus with Alcohol-Epoxide Mixtures Various combination of alcohols and epoxides were reacted with white phosphorus under the conditions summarized in Table I. A catalytic amount of potassium metal was added at room temperature to the alcohol or to the reaction mixture, and then the reaction mixture was heated to reflux while vigorously stirred under nitrogen. When phosphorus was completely consumed, the reaction mixture was evaporated under vacuum (0.5 mm. Hg) at 40°–50° C. to constant weight.

TABLE I

| ex. no. | Alcohol | mol[a] | epoxide | mol[a] | K, % [b] | Reaction temp., °C. | time, hr. |
|---|---|---|---|---|---|---|---|
| 2 | n-propanol | 1.0 | propylene oxide | 1.7 | 2.5 | 42–46 | 1 |
| 3 | propylene glycol | 1.5 | 1,2-butylene oxide | 1.5 | 5 | 56–112 | 2 |
| 4 | n-butanol | 1.5 | propylene oxide | 2 | 5 | 42–53 | 1 |
| 5 | sec-butanol | 1.5 | propylene oxide | 2 | 5 | 47–55 | 1 |
| 6 | n-dodecanol | 1.5 | propylene oxide | 2 | 5 | 47–61 | 2.5 |
| 7 | n-propanol | 1 | epoxide A[c] | 1.25 | 2.5 | 50–125 | 0.2 |
| 8 | — | — | epoxide B[d] | 2 | 2.5 | 80–140 | 1 |
| 9 | n-propanol | 2 | aminoepoxide[e] | 2 | 2.5 | 54–75 | 1.2 |
| 10 | n-propanol | 2 | epoxide C[f] | 2 | 5 | 53–57 | 1 |
| 11 | aminoalcohol[g] | 2 | propylene oxide | 2 | 5 | 45–61 | 0.6 |
| 12 | ethanol | 5 | propylene oxide | 2.5 | 10[h] | 46–66 | 2.5 |

[a] Based on one g. atom of P.
[b] G. atom % of P.
[c] Vinylcyclohexene dioxide.
[d] 4-Oxatetracyclo[6.2.1.02,7.03,5]undecan-9(10)-ol.
[e] N-glycidyl diethylamine.
[f] Vinylcyclohexene monoxide.
[g] N,N-Dimethyl Ethanolamine.
[h] Sodium metal.

EXAMPLE 13

Potassium Mercaptide Catalyzed Reaction of Phosphorus with n-Butyl Mercaptan and Propylene Oxide About 0.5 gm. of yellow phosphorus and 5 ml. of propylene oxide were added to a test tube containing about 5 ml. of n-butyl mercaptan in which 0.05 gm. of potassium metal had been dissolved. Upon warming, the reaction mixture turned deep red. The color faded when the phosphorus was consumed. The colorless solution was added to another test tube containing same reactants except potassium. Again the red color formation was observed at room temperature, and upon warming phosphorus was consumed.

EXAMPLE 14

Reaction of Phosphorus with N,N-Dimethylethanolamine (DMEA) and Propylene Oxide or Ethylene Oxide A mixture of 6.2 gm. of yellow phosphorus, 23 gm. of propylene oxide and 28 gm. of N,N-dimethylethanolamine was heated to 45° C. whereupon the reaction mixture turned to dark red with heat evolution. The color faded and the phosphorus was completely consumed in about 20 minutes. After evaporation, there was obtained 50 gm. of a yellow, viscous liquid with a phosphorus content of 11.61 percent, corresponding to 95 percent yield based on phosphorus.

Similar results were obtained with ethylene oxide except that a longer reaction time was required due to the lower reflux temperature of the reaction mixture.

EXAMPLE 15

DMEA-Catalyzed Reaction of Phosphorus with Methanol and Propylene Oxide

A mixture of 6.2 gm. of yellow phosphorus, 2 ml. of propylene oxide, and 0.9 gm. of N,N-dimethylethanolamine was heated to 45° C. To the resulting red molten mixture was added dropwise a mixture of 11.6 gm. of propylene oxide and 12.8 gm. of methanol. Phosphorus was completely consumed, after 0.5 hour at 45°–75° C. Evaporation of the reaction mixture gave 18 gm. of a light yellow, water-insoluble, viscous liquid containing 27 percent P.

EXAMPLE 16

Formaldehyde Derivative of the Product from Example 15

The product from Example 15 was treated with 16 ml. of 37 percent aqueous formaldehyde and then with 6 ml. of 30 percent hydrogen peroxide. After evaporation of the reaction mixture, there was obtained a colorless viscous liquid having 18.76 percent p.

In another experiment, the formaldehyde-modified product was oxidized by air until the silver nitrate test for the PH bond was negative. After evaporation to constant weight, the product was further treated with propylene oxide until the acid number was about 3. The final product had a phosphorus content of 17%, corresponding to an overall yield of 95 percent based on phosphorus.

EXAMPLE 17

Acrylonitrile Derivative of the Product of Example 15

The product from an experiment similar in all significant respects to Example 15 was reacted exothermically with acrylonitrile. The characteristic infrared absorption band of the P-H group at 3.33$\mu$ disappeared and that of the CN group appeared at 4.45$\mu$, indicating the conversion of the P-H group to the $PCH_2CH_2CN$ group.

EXAMPLE 18

DMEA-Catalyzed Reaction of Phosphorus with Methanol and 1,2-Epoxytetradecane

A mixture of 6.2 gm. of yellow phosphorus, 3 ml. of 1,2-epoxytetradecane and 0.9 gm. of N,N-dimethyl ethanolamine was heated to 60° C. Then a mixture of 6.4 gm. of methanol and 42.4 gm. of 1,2-epoxytetradecane was added dropwise over a 20-minute period at 50°–70° C. During the following 20 minutes, an exothermic reaction took place with a deep red color formation. When the color faded, all phosphorus was consumed. The reaction mixture was oxidized with an excess of 30 percent hydrogen peroxide and then evaporated. There was obtained 50 gm. of a white semisolid which showed surface activity when dissolved in water. The sodium salt of the semisolid was also surface active.

EXAMPLE 19

Preparation Of Flame Retardant Rigid Foams

These organophosphorus products were prepared by potassium alkoxide catalysis as previously described.

Compound I: The reaction product of phosphorus, propylene glycol and propylene oxide; 13.1 percent P.

Compound II: Compound I treated with formaldehyde; 9.3 percent P.

Compound III: The reaction product of phosphorus, 1,2-butylene oxide and propylene glycol was air oxidized and further treated with 1,2-butylene oxide; 11.6 percent P.

Rigid urethane foams were prepared by the one-shot technique using the following recipe:

|  | Phr |
|---|---|
| Phosphorus Compound | 20 |
| Polyol A[1] | 80 |
| Surfactant[2] | 1.5 |
| Dibutyltin Dilaurate | 1.5 |
| Isocyanate[3] (about 5% excess) | 95.7 |
| Trichlorofluoromethane | 34 |

[1] An 80/20 propylene oxide/ethylene oxide adduct of a 1:1:1 phenol:aniline:formaldehyde condensation product; hydroxyl number was 320.
[2] A polysiloxane-polyoxyalkylene block copolymer.
[3] An organic polyisocyanate prepared by phosgenation of an aniline/formaldehyde condensation product having an average of about 2.5 aromatic nuclei per molecule.

The rigid foam systems were rated nonburning as shown in Table II.

TABLE II

Flammability Test (ASTM D1692)

| Foam Containing P-Compound | I | II | III |
|---|---|---|---|
| Density, pcf. | 1.73 | 1.54 | 1.73 |
| Ignition, sec. | 18 | 17 | 17 |
| Extinguishment, sec. | 37 | 35 | 36 |
| Extent, in. | 1.0 | 1.0 | 0.9 |

EXAMPLE 20

Preparation of Flame Retardant Cotton Fabrics

Phosphorus Compound IV was prepared by treating the reaction product of phosphorus, methanol, and propylene oxide with aqueous formaldehyde, followed by air oxidation; 19.3 percent P. It was found to give flame retardant properties to 8 oz/sq. yd. cotton twill as shown in Table III. The flammability of the fabrics were examined by the Ellipse Flame Test [P. Hay, American Dyestuff Reporter, 53, 812–815 (1964)] and by the Vertical Flame Test [The American Association of Textile Chemists and Colorists, Standard Method 34–1952]b5.

TABLE III

| formulation | wt. % | cured °F.-/min | fabric state[a] | add-on % | stiffness warp | break lb. | ellipse[b] m.m. | char, in. | Vertical[c] A.F., sec. |
|---|---|---|---|---|---|---|---|---|---|
| Control | — | — | W | — | 6.1 | 162 | BEL | BEL | 28 |
|  | — | — | B | — | 5.3 | 166 | BEL | — | — |
| THPC[d] | 7.0 | 300/8 | W | 7.4 | — | — | 5.4 | 4.8 | 0 |
| APO[e] | 7.7 |  | B | — | 9.8 | 132 | 14 | — | — |
| Triethanolamine | 1.25 |  |  |  |  |  |  |  |  |
| P-Compound IV | 15.0 | 300/8 | W | 14.4 | — | 7 | 5.3 | — | 0 |
| Aerotex Resin MW[f] | 10.0 |  |  |  |  |  |  |  |  |
| Aerotex Accellerator No. 5 | 3.38 |  |  |  |  |  |  |  |  |

[a]W = Rinsed with tap water, washed (0.01% Amber Flakes) in a home laundry machine, and tuble dired; B = Boiled 3 hrs. in 0.5% Amber Flakes and 0.2% sodium carbonate.
[b]Ellipse Flame Test; BEL = Burned entire length.
[c]Vertical Flame Test; A.F. = After flaming.
[d]Tetrakis(hydroxymethyl)phosphonium chloride.
[e]Tris-1-aziridinylphosphine oxide
[f]Modified melamine-formaldehyde condensate sold by American Cyanamid Company

EXAMPLE 21

Oxidation and Esterification of the Product from Example 15

The product from experiment similar in all significant respects to Example 15 was oxidized with air at 65° C. overnight. The reaction mixture was further treated with aqueous hydrogen peroxide to ensure the complete conversion of the trivalent phosphorus groups to the pentavalent phosphorus groups. The reaction mixture was evaporated to remove water and then treated with excess propylene oxide until the acid number of the reaction mixture was essentially zero. The final product had a phosphorus content of 15 percent, corresponding to an overall yield of 85 percent based on phosphorus.

It has also been found that a wide variety of fibrous materials can also be treated to impart flame retardance thereto particularly those materials which have presented difficulties in the past such as fibrous materials constituted with blends of cotton/polyester fibers.

The treatment of impart flame retardancy to fibrous materials may be applied to any fibrous material containing primarily cellulosic fibers such as cotton, viscose rayon, cupra ammonium, cellulose rayon, or to mixtures of various fibers with cotton such as cotton polyester fibers, cotton/synthetic fibers, cotton/wool fibers and the like. Products which can be flame retarded and which are fabricated from the above fibers include wall paper, synthetic wall coverings; textile fabric wall coverings; lamp shades; automobile seat covers; automobile upholstery, e.g., door panels, overhead liners, etc.; upholstery for furniture; clothing; apparel accessories, e.g., ties, fabric belts, scarves, hats, etc.; canvas products, e.g., tents, folding cots, etc.; draperies; throw pillows; hassocks; sporting goods; fabric garment bags and luggage; fabric handbags; fabric shoes or shoes made from synthetic materials; linens; book covers; mattress covers; stuffed toys; hammocks; deck chairs, etc.

Moreover, and more specifically, the process of the present invention is preferably used for treating textile materials containing both polyester and cellulosic fibers, although fibrous materials containing little or no cellulosic fibers are also contemplated such as fibrous substrates formed from a mixture of polyester, such as poly(ethylene terephthalate) and polyamide such as poly(hexamethylene adipamide) or acrylic fibers, such as polyacrylonitrile, and copolymers containing at least about 85 per cent combined acrylonitrile filaments or fibers, cotton or rayon.

The fibrous material which can be treated according to the present invention can also be in the form of woven or knitted fabrics, or non-woven fabrics derived from webs or from fibrous or filamentous webs contained in any suitable fashion, such as by air-deposition wherein the fibers or filaments are distributed in a random array. The treatment may also be applied to yarns, threads or other applied structures, or it may be applied to fibers or filaments in the form of loose or bulk masses or in the form of one or less compacted webbing, matting or batting.

The reaction product (flame retardant) of phosphorus, methanol, propylene oxide or ethylene oxide followed by reaction with aqueous formaldehyde can be applied to the fibrous material by any of the conventional techniques. Thus, the flame retardant can be incorporated into an aqueous bath in the usual manner together with other additives such as softeners, surfactant, catalysts and other auxiliaries, and thereafter applied to the fabric by conventional methods. These methods include spraying, knife coating, roller coating, padding from aqueous solvents or mixtures of non-aqueous solvents, various combinations of these and the like. Normally, there is incorporated into the treating bath from about 5 to about 60 per cent or more of the flame retardant to the extent that the dry pickup or add-on is between about 1 per cent to about 60 per cent by weight based upon the weight of the fibrous material.

An more particularly desirable advantage of the flame retarding agents is that they can be incorporated into systems wherein there are present agents which are added to cloth to attain a particular result. For example, the flame retarding agents are particularly suitable when employed in combination with durable press resins. Indeed, I have found that when the flame retardants of the present invention are incorporated into systems utilizing durable press resins to be added on the fabric or fibrous material, that the resultant combination product imparts to the fibrous material a high degree of flame proofing which is more laundry durable than if the flame proofing agent were employed individually, that is, without combination with a durable press resin.

The durable press resins contemplated are the methylol amide and/or the methylol melamine durable press resins and most preferred are those resins having a high nitrogen content. In general, the preferred durable press resins which can be employed can be additionally grouped in one of three following categories:

TYPE I

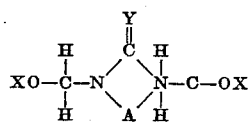

wherein X is hydrogen or alkyl containing one to three carbon atoms; Y = O or S; A is a divalent radical of the formula —CHR' —G$_n$R'HC— wherein R' is hydrogen, alkoxy, alkyl or hydroxy; G is —CH$_2$—, —CHR', or

O, S; and wherein $n=0$ or 1.

TYPE II

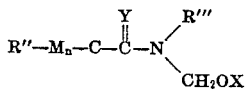

Wherein R" = —CH$_2$OX, an alkyl group containing one to three carbons, and —CHXCH$_2$YX; R''' = hydrogen, alkyl containing one to three carbon atoms, —CH$_2$OX; M = O, N or S; and wherein X, Y, and n are as above defined.

TYPE III

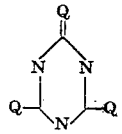

wherein Q may be alike or different and is —NH$_2$,

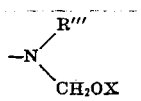

, wherein R''' and X are defined as above.

Some of the common resins of Type I can be represented by the following structures:

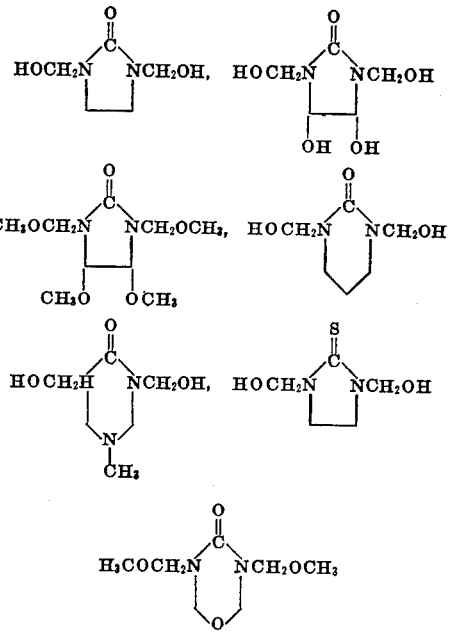

and

Some of the common resins of Type II include:

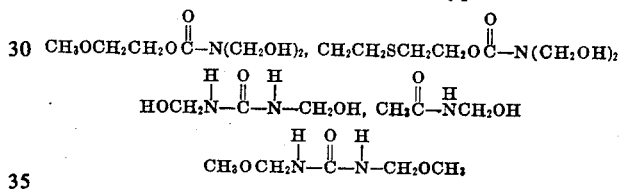

Some of the common resins of Type III include:

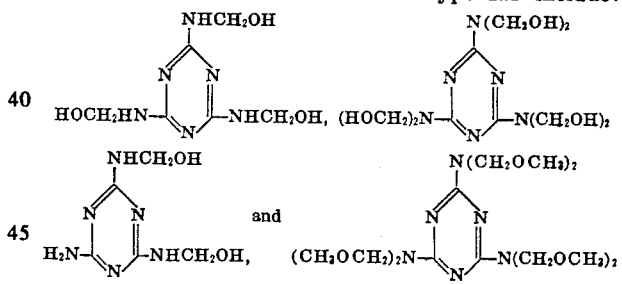

As a general rule, the preferred durable press resins which can be employed in combination with the reaction product according to the present invention are the methylol amide and/or the methylol melamine durable press resins, and most preferred are those resins having a high nitrogen content. Thus, the resins of Type III have been found to be particularly useful. Of this type, the preferred resins are trimethylolmelamine, hexamethylolmelamine and hexamethoxymethylmelamine. Equally good results are obtained using resins of Type III in mixtures with resins of Types I and/or II, provided the Type III resin constitutes 20 per cent or more (by weight) of the mixture. The preferred mixtures contain about 75 per cent (by weight) trimethylolmelamine or hexamethoxymethylmelamine and 25 percent trimethylolurea, trimethoxymethylurea, ethylene urea or dimethylolethylene urea.

The preferred method for applying the reaction product of the durable press resin described herein is by immersing the fibrous material into an aqueous solution of both. After immersion, the material is removed from the solution and heated for a sufficient time, and at a sufficient temperature, to render the composition formed in situ laundry durable.

The flame retardant compositions which can be prepared by combining the reaction product heretofore described (phosphorus, methanol, propylene or ethylene oxide, etc.) with the durable press resin contemplated appear to be the result of a reaction between the two types reactants (although we do not wish to be bound by the mechanism involved). The equivalent weight ratios of reaction product, i.e., phosphorus, etc., to the durable press resin can vary from 0.1 to 10 or more. In practice, however both the preferred ratio and the total amount of these compositions incorporated on or in a fibrous material will depend on the inherent flammability of the substrate and the level of flame resistance desired. For example, on a cotton fabric or a cotton polyester fabric, useful ratios and total add-on have been found to be those which produce a product containing from about 0.5 per cent to about 8 per cent phosphorus and from about 1 per cent to about 10 per cent nitrogen (based on the weight of the finished fabric).

It has been found that certain catalysts facilitate the in situ reaction between phosphorus containing products heretofore described and the durable press resins. These catalysts can be either protic acids, Lewis acids, or mixtures of each. Examples of suitable protic acids are acetic acid, formic acid, hydrochloric acid, nitric acid, sulfuric acid, phosphoric acid, mono- or dibasic salts of phosphoric acid, hydrochloric acid salts of organic amines, ammonium chloride, mixtures of these acids, and the like. Examples of suitable Lewis acids are zinc and magnesium salts of strong mineral acids, zinc and magnesium fluorborates, mixtures of the salts and the like.

To facilitate the setting of the durable press resin with combined reaction product into the substrate, the substrate is heated by standard procedures. Thus, the wet textile is subjected to drying at an elevated temperature, for example 100° to 500° F. After the cloth has been cured it can be finished according to standard textile mill procedures. Normal finishing procedures include calendering, framing, blueing, compressive shrinking, and the like.

While the preferred method for treating a fibrous material with the flame retarding compositions described herein is by an in situ reaction of the reactants which have been applied by padding with an aqueous solution containing these reactants, a wide variety of methods can be used to incorporate these compositions into or onto the fibrous material. These methods include spraying, knife coating, roller coating, padding from non-aqueous solvents or mixed aqueous and non-aqueous solvents, various combinations of these, and the like. In all cases, the reactants might be pre-reacted, or reacted in situ on the fibrous material.

In a representative technique, an aqueous solution containing by weight from about 5 to about 40 per cent or more of the reaction product (phosphorus, etc.) and from about 5 to about 50 per cent of the durable press resin (or mixtures of durable press resins) is padded onto a fibrous material, in the usual manner, and preferably while the padding bath has a pH of from about 2 to about 10, to the extent that the dry pickup or add-on is between about 1 per cent to about 50 per cent by weight (based upon the dry weight of the fibrous material). About 0.1 per cent to about 30 per cent by weight of catalyst (based on the weight of the padding bath), can be added to the padding bath to produce a more durable finish.

The examples which follow will further illustrate the invention. Where not otherwise specified, temperatures are given in degrees centigrade, parts are by weight.

In the following examples, the terms indicated below shall have the indicated meaning:

"AEROTEX-C23 SPECIAL"- A triazine durable press resin manufactured by American Cyanamide Corporation, which contains a methylolated melamine (about 75 per cent of the solids content), and a urea-based product in aqueous solution.

"CATALYST X-4" - A modified solution of zinc nitrate made by the Sun Chemical Company.

"TERGITOL 15-S-9" - A nonionic surfactant (a $C_{11}$ - $C_{15}$ linear chain alcohol-ethylene oxide adduct) available from Union Carbide Corp.

FABRITONE PE - A polyethylene-based softener available from C. H. Patrick Co.

AATCC-34-1966 - A vertical flame test of the American Association of Textile Chemists and Colorists.

B.E.L. - Means that the sample burned the entire length.

P-Compound V - The reaction of white phosphorus, methanol, and ethylene oxide, in the presence of dimethylethanolamine as catalyst and the reaction product thereafter treated with formaldehyde. The compound V was prepared as follows: to one mole of white phosphorus and 0.05 mole of dimethylethanolamine was added, under nitrogen, 1.1 mole of ethylene oxide dissolved in 1.1 mole of methanol. After one hour at 85°-90° C., 60 gm. (1.1 mole) of a 55 percent formaldehyde in methanol solution was added over 1 hour at 90° C. The mixture was then stripped for 40 min. at 90° C. under a pressure of 3 mm. of Hg.

DMDHEU - Abbreviation for 1,3-dimethylol-4,5-dihydroxyethylene urea.

PERMAFRESH 183 - A 1,3-dimethylol-4,5-dihydroxyethylene urea-based resin (binder) available from Sun Chemical Co.

CYMEL 300 - Anhydrous hexamethoxymethylmelamine manufactured by American Cyanamide Corporation.

EXAMPLE 22

Treatment of Cotton Broadcloth with Phosphorus Compound V and DMDHEU

Individual swatches of white, untreated 136 × 64 cotton broadcloth were treated with aqueous baths by a single dip, singly nip padding operation (Butterworth laboratory padder at 60 psi). The baths contained phosphorus compound V and a 1,3-dimethylol-4,5-dihydroxyethylene urea-based resin (binder), as well as other components as summarized in Table IV. After padding, the swatches were placed on tenter frames. Using forced air ovens, the swatches were dried for 1.5 minutes at 350° F. and cured for 1.25 minutes at 350° F. The swatches were laundered one time (washing procedure III in AATCC Tentative Test Method 124-1967T, followed by drying procedure A), and conditioned at 70° F. and 65 per cent relative humidity. The fabric properties (summarized in Table IV) were evaluated by the following standard procedures:

Flammability - vertical flame test, AATCC 34-1966
wrinkle recovery - AATCC Tentative Test Method 66-1959T
wash-wear rating - AATCC Tentative Test Method 124-1967T, Washing Procedure III
tensile strength - ASTM Method D-1682 (Grab)
tear strength - ASTM D1424-59 (Elmendorf)
chlorine damage - AATCC 11401967.

The results of these tests are shown in Table IV.

Table IV

|  | 1[e] | 2 | 3 | 4 | 5 | 6 |
|---|---|---|---|---|---|---|
| Phosphorus Compound V Concentration[a] | — | 18.7 | 22.5 | 25.0 | 22.5 | 16.5 |
| Binder[b] concentration[a] | — | 27.5 | 35.0 | 45.0 | 40.0 | 30.0 |
| Catalyst concentration[a] | — | 7.0[g] | 7.0[g] | 7.0[g] | 4.0 | 0.4[h] |
| Softener[c] concentration[a] | — | 0 | 0 | 0 | 1.0 | 2.0 |
| Surfactant[d] concentration[a] | — | 1.0 | 1.0 | 1.0 | 1.0 | 0 |
| Urea concentration[a] | — | 0 | 0 | 0 | 0 | 0 |
| Wet pick-up (percent) | — | 88.2 | 84.4 | 88.0 | 89.0 | 90.0 |
| Wrinkle recovery (deg.) Warp and fill | 198 | 274 | 238 | 256 | 253 | 90.00 |
| Wash-wear rating Tumble dry | 1.0 | 3.1 | 2.4 | 2.9 | — | — |
| Tensile strength (lbs.) Filling direction | 59 | 29 | 32 | 38 | — | — |
| Tear strength (gms.) Filling direction | 480 | 112 | 240 | 256 | 210 | 323 |
| Chlorine damage (percent) | — | 0 | 3 | — | — | — |
| Flammability-char (inches) |  |  |  |  |  |  |
| Zero washings | BEL[f] | 7.5 | 6.5 | 6.25 | — | — |
| One washing | — | 7.3 | 6.2 | 6.0 | 9.0 | 6.5 |
| Five washings | — | 9.5 | 8.0 | 7.0 | — | — |

[a]Percent by weight in pad bath
[b]45 percent active DMDHEV, Permafresh 183 from Sun Chemical Co.
[c]35 percent polyethylene emulsion from C. H. Patrick Co.,
[d]TERGITOL 15-S-9,
[e]untreated fabric,
[f]burn entire length,
[g]Catalyst
[h]NH₄Cl.

EXAMPLE 23

Treatment of Cotton Broadcloth with Phosphorus Compound V and a Triazine-based Resin Swatches of white, untreated 136 × 64 cotton broadcloth were treated by the pad-dry-cure method of Example 22 with aqueous solutions of phosphorus compound V containing a 50 percent active triazine-based resin (Aerotex 23 from American Cyanamide). Each bath also contained 6 percent softener (35 percent polyethylene emulsion, Fabritone PE from C. H. Patrick Co.), 0.15 percent surfactant (footnote d, Table IV), 3.0 percent urea and 1.5 percent NH₄Cl. The compound V and binder concentrations, and results of the subsequent fabric evaluation tests (obtained as in Example 22) are summarized in Table V below:

TABLE V

| | Run Number | |
|---|---|---|
| | 1 | 2 |
| Phosphorus Compound V concentration[a] | 24.6 | 22.4 |
| Binder[b] concentration[a] | 26.6 | 22.2 |
| Wet pick-up (percent) | 77.3 | 77.3 |
| Wrinkle recovery (deg.) Warp and fill | 236 | 220 |
| Tensile strength (lbs.) Filling direction | 32 | 34 |
| Tear strength (gms.) Filling direction | 304 | 400 |
| Flammability-char (inches) |  |  |
| One washing | 8.0 | 9.0 |

[a]Percent by weight in pad bath.
[b]Aerotex 25-5

EXAMPLE 24

Treatment of Cotton Broadcloth with Phosphorus Compound V and Hexamethoxymelamine Swatches of white, untreated 136 × 64 cotton broadcloth were treated by the pad-dry-cure method of Example 22 with aqueous solutions of phosphorus compound V containing hexamethoxymelamine (Cymel 300 from American Cyanamide APA binder). Each bath also contained 2 percent softener (35 percent polyethylene emulsion, Fabritone PE), 0.05 percent surfactant (TERGITOL 15-S-9), 3.0 percent urea and 0.5 percent ammonium chloride. The phosphorus compound V and binder concentrations, and results of subsequent fabric evaluation tests (obtained as in Example 22) are summarized below:

| | Run Number | |
|---|---|---|
| | 1 | 2 |
| Phosphorus compound V concentration[a] | 25 | 25 |
| Binder[b] concentration a | 16 | 19 |
| Wet pick-up (percent) | 84.0 | 84.0 |
| Tear strength (gms.) Filling direction | 352 | 320 |
| Flammability-char (inches) |  |  |
| Five washings | 7.5 | 5.5 |
| Ten washings | 6.5 | 5.5 |
| Twenty washings | BEL | BEL |

[a]Percent by weight in pad bath
[b]Hexamethoxymelamine (Cymel 300 from American Cyanamide).

Example 25

Treatment of Cotton Broadcloth with Phosphorus Compound V and Trimethylol melamine Swatches of white, untreated 136 × 64 cotton broadcloth were treated by the pad-dry-cure method of Example 22 with aqueous solutions of phosphorus compound V containing a trimethylolmelamine-based resin (Aerotex m3). Each bath also contained 2 percent softener Fabritone PE, 1 percent urea, 0.05 percent surfactant (Tergitol 15-S-9) and a catalyst. The binder and catalyst concentrations, and the results of the subsequent fabric evaluation tests (obtained as in Example 22 are summarized below:

| | Run Number | | | |
|---|---|---|---|---|
| | 1 | 2 | 3 | 4 |
| Phosphorus compound V concentration[a] | 25.0 | 25.0 | 25.0 | 25 |
| Binder[b] concentration[a] | 15.0 | 20.0 | 24.0 | 15 |
| Catalyst concentration[a] | 0.5[c] | 0.5[c] | 0.5[c] | 0.5[c] |
| Wet pick-up (percent) | 85.0 | 85.0 | 85.0 | 85.0 |
| Tear strength (gms.) Filling direction | 370 | 336 | 240 | 370 |
| Flammabilitiy-char (inches) | | | | |
| Five washings | 5.0 | 4.5 | 4.0 | — |
| Ten washings | 4.0 | 4.0 | 3.5 | — |
| Fifteen washings | 3.0 | 3.5 | 3.0 | — |
| Twenty-five washings | — | — | — | 6.5 |

[a]Percent by weight of pad bath.
[b]Eighty percent aqueous trimethylolmelamine (Aerotex M3 from American Cyanamide).
[c]NH$_4$Cl.

EXAMPLE 26

Treatment of Cotton flannel with phosphorus compound V and trimethylolmelamine

A swatch of white, untreated cotton flannel was treated with an aqueous solution by the pad-dry-cure procedure of Example 22 to a wet pick-up of 100 percent. The pad bath contained 25 percent phosphorus compound V, 30 percent resin binder (50 percent active triazine-based resin, Aerotex 23), 2 percent urea, 0.55 percent surfactant (Tergitol 15–S–9) and 4 percent catalyst (Catalyst X–4). After one washing, the tear strength (ASTM D1424-59, Elmendorf) of the treated fabric was 304 gms. (untreated = 1,000 gms.). The flammability of the sample was tested (vertical flame test, AATCC 34–1966) after both 15 and 25 launderings (Washing Procedure III, tumble dry from AATCC Tentative Test Method 124–1967T). The char lengths of the samples were five and four inches respectively.

Example 27

Treatment of Cotton Broadcloth with Phosphorous Compound V and Dimethoxymethylurea A swatch of white, untreated cotton broadcloth was padded to 100 percent wet pick-up (using a hand wringer) in an aqueous solution containing 25 percent phosphorus compound V, 15 percent N,N'-dimethoxymethylurea and 10 percent modified zinc nitrate (Catalyst X–4). After curing for 5 minutes at 165° C. (forced air oven) the swatch was vigorously washed by hand, and dried 2 minutes at 165° C. The char length (vertical flame test, AATCC 34–1966 ) of the sample after conditioning 12 hours at 75° F. and 65 percent relative humidity was 5.0 inches.

EXAMPLE 28

Treatment of Rayon with Phosphorus Compound V and a Triazine-based Resin

A bundle of white, untreated rayon stable was immersed in an aqueous solution containing 25 percent phosphorus compound C, 30 percent of a 45 percent active triazine-based resin (Aerotex 23), 0.05 percent surfactant (Tergitol 15–S–9), 1 percent urea and 4 percent modified zinc nitrate catalyst. The wet pick-up, obtained using a hand wringer, was 118 percent. After drying for 5 minutes at 165°C., the fibers were washed as in Example 27 and conditioned at 70° F. and 65 percent relative humidity. A bundle of the treated fibers was passed over a match flame at the rate of one pass/sec, and charring occurred. Untreated fibers, subjected to the same test, instantly burst into flame.

EXAMPLE 29

Treatment of a 35:65 Cotton-Polyester Fabric with Phosphorus Compound V and a Triazine-based Resin Swatches of white, untreated 35:65 cotton-polyester fabric (35percent cotton, 65 percent polyester) were padded by a single dip, single nip operation using an Atlas laboratory wringer with a solution containing phosphorus compound V, a resin binder (80 percent active triazine-based resin, Aerotex M3, 4 percent modified zinc nitrate catalyst, 0.05 percent surfactant (Tergitol 15 –S–9), 2 percent softener (35 percent polyethylene emulsion, and 1 percent urea. The concentrations of phosphorus compound V and binder, and the results of subsequent fabric evaluation tests (obtained as in Example 22), are summarized below:

| | Run Number | | |
|---|---|---|---|
| | 1 | 2 | 3 |
| Phosphorus compound V concentration[a] | 30.0 | 30.0 | 38.0 |
| Binder[b] concentration[a] | 20.0 | 25.0 | 25.0 |
| Tear Strength (gms.) Filling direction | 400 | 384 | 416 |
| Flammability-char (inches) | | | |
| One washing | 6.0 | 6.0 | 6.75 |
| Five washings | 6.0 | 6.0 | 6.75 |
| Ten washings | 7.0 | 6.0 | 6.0 |
| Twenty-five washings | 6.5 | 7.5 | 7.5 |

[a]Percent by weight in pad bath
[b]80 percent active trimethylolmelamine (Aerotex M3).

EXAMPLE 30

Treatment of a 65:35 Cotton-polyester Blend with Phosphorus Compound V

A sample of cotton-polyester blend fabric (65 percent cotton, 35 percent polyester) was treated with a 30 percent aqueous solution of phosphorus compound V, via the pad-roll application technique. The add-on, after drying in a forced air oven at 150° C. for 4 minutes, was 25 percent.

The results of the vertical flame test (AATCC–34–1966) for both the treated and untreated samples were as follows:
Treated = 5 in. char length
Untreated (control) = Burned entire length.

EXAMPLE 31

Treatment of Wool with Phosphorus Compound V

In a manner described in Example 30, a sample of wool (8 oz/yd$^2$) was treated with a 20 per cent aqueous solution of phosphorus compound V. The add-on, after drying in a forced air oven for 4 minutes at 150° C., was 20 per cent.

The vertical flame test results were as follows:
Treated = 3 in. char length
Untreated (control) = Burned entire length

EXAMPLE 32

Treatment of Cotton Broadcloth with Phosphorus Compound V

In a manner described in Example 30, a sample of cotton broadcloth (136 × 64), was treated with a 20 per cent aqueous solution of phosphorus compound V. The add-on, after drying in a forced air oven for 4 minutes at 150° C., was 16 per cent.

The vertical flame test results were as follows:
Treated = 5 ½ in. char length
Untreated (control) = burned entire length

EXAMPLE 33

Treatment of Cotton Flannel with Phosphorus Compound V

In a manner described in Example 30, a sample of cotton flannel was treated with a 20 per cent aqueous solution of phosphorol. The add-on, after drying in a forced air oven for 4 minutes at 150° C., was 20 per cent.

The results of the vertical flame tests were as follows:
Treated = 6 in. char length
Untreated (control) = burned entire length

EXAMPLE 34

Treatment of a Laboratory Paper Towel with Phosphorus Compound V

In a manner described in Example 30, a sheet of unabsorbent laboratory paper towel (made by the Scott Paper Co.), was treated with a 20 per cent aqueous solution of phosphorus compound V. The add-on, after drying in a forced air oven for 4 minutes at 150° C., was 20 per cent.

The results of the vertical flame test were as follows:
Treated paper towel = 9 in. char length
Untreated paper towel (control) = burned entire length

EXAMPLE 35

Treatment of Pine Wood with Phosphorus Compound V

A stick of pine wood (2mm. diam., 15 cm. length, available form laboratory supply houses for use in vacuum distillation, etc.), was soaked in a 20 percent aqueous solution of phosphorus compound V for 30 min. This sample was then dried in a forced air oven for 4 minutes at 150° C.

The flammability test used in this example was as follows: The stick, supported at one end, was held in a horizontal position, with ½ in. of the unsupported end placed in a Bunsen burner flame. The length of char was then measured. Results:
Treated pine wood: 1 in. char length
Untreated pine wood (control): Burned entire length

EXAMPLE 36

Treatment of Cellulose Triacetate with Phosphorus Compound V

A sample of light weight unfinished cellulose triacetate fabric was added to 100 percent wet pick-up with a 20 percent solution of aqueous phosphorus compound V. After drying 4 min. at 150° C., a ½ inch strip of fiberglass was stapled along its entire length up the center of the sample (without the fiberglass, an untreated sample shrinks from the flame and does not ignite). The vertical flame test (AATCC–34–1966) resulted in burning of the untreated sample up the entire length of the sample. Under identical conditions, the treated sample extinguished itself after burning up the fiberglass strip 6 inches.

What is claimed is:

1. A flame retardant cellulosic fabric produced by a process which comprises treating a cellulosic fabric with a flame retardant amount of the product produced by reacting (a) element phosphorous, (b) ethylene oxide or propylene oxide and (c) methanol in the presence of a catalytic quantity of a base to produce an organophosphorus composition, where in said process is carried out at a temperature within the range of from about 25° C. to about 200° c., and thereafter reacting said organophosphorus composition with formaldehyde in proportions, at a temperature, and for a period of time sufficient to convert substantially all phosphinous hydrogen in said organophosphorous composition to hydroxymethyl groups.

2. The cellulosic fabric of claim 1 wherein said cellulosic fabric is cotton.

3. A flame retardant fibrous material produced by a process which comprises treating a fibrous material with a flame retardant amount of the product produced by reacting (a) elemental phosphorous, (b) ethylene oxide or propylene oxide and (c) methanol; in the presence of a catalytic quantity of a base to produce an organophosphorus composition, wherein said process is carried out at a temperature within the range of from about 25° C. to about 200° C. and thereafter reacting said organophosphorus composition with formaldehyde in proportions, at a temperature, and for a period of time sufficient to convert substantially all phosphinous hydrogen in said organophosphorus composition to hydroxymethyl groups.

4. A fibrous material according to claim 3 wherein said fibrous material is a textile fabric comprising polyester and cellulosic fibers.

5. A fibrous material according to claim 4 wherein said cellulosic fibers are cotton fibers.

6. A flame retardant fibrous material produced by a process which comprises treating a fibrous material with a flame retardant amount of the product produced by reacting (a) elemental phosphorus, (b) ethylene oxide, and (c) methanol; in the presence of dimethylethanol amine as catalyst to produce an organophosphorus composition, wherein said process is carried out at a temperature within the range of from about 25° C. to about 200° C. and thereafter reacting said organophosphorus composition with formaldehyde in proportions, at a temperature, and for a period of time sufficient to convert substantially all phosphinous hydrogen in said organophosphorus composition to hydroxymethyl groups.

7. A fibrous material according to claim 6 wherein said fibrous material is a textile fabric comprising polyester and cellulosic fibers.

8. A fibrous material according to claim 7 wherein said cellulosic fibers are cotton fibers.

9. A fibrous material according to claim 6 wherein said fibrous material is a textile fabric comprising cotton fibers.

10. A flame retardant fibrous material produced by a process which comprises treating a fibrous material with a flame retardant amount of the product produced by the steps of (1) reacting (a) elemental phosphorous, (b) ethylene oxide or propylene oxide and (c) methanol; in the presence of a catalytic quantity of a base to produce an organophosphorus composition, wherein said process is carried out at a temperature within the range of from about 25° C. to about 200° C., reacting said organophosphorus composition with formaldehyde in proportions, at a temperature, and for a period of time sufficient to convert substantially all phosphinous hydrogen in said organophosphorous composition to hydroxymethyl groups. (2) combining the product of step (1) with a durable press resin selected from the group consisting of durable press resins of the formula:

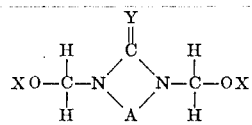

where: X is hydrogen or alkyl containing one to three carbon atoms; Y is O or S; A is a divalent radical of the formula —CHR'—$G_n$—R'HC—, R' is hydrogen, alkoxy, alkyl or hydroxy; G is —$CH_2$13 , CHR'—,

O or S; and wherein $n = 0$ or 1, and

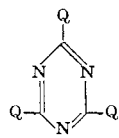

where: Q may be alike or different and equals —$NH_2$,

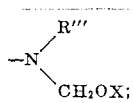

and wherein R''' = hydrogen, alkyl containing one to three carbon atoms, —$CH_2OX$; and X = hydrogen or alkyl containing one to three carbon atoms, and (3) heating the combined products of steps (1) and (2) to a temperature of 100° to 500° F.

11. A flame retardant fibrous material produced by a process which comprises treating a fibrous material with a flame retardant amount of the product produced by the steps of (1) reacting (a) elemental phosphorous, (b) ethylene oxide or propylene oxide and (c) methanol; in the presence of a catalytic quantity of a base, to produce an organophosphorus composition, wherein said process is carried out at a temperature within the range of from about 25° C. to about 200° C. and thereafter reacting said organophosphorus composition with formaldehyde in proportions, at a temperature, and for a period of time sufficient to convert substantially all phosphinous hydrogen in said organophosphorous composition to hydroxymethyl groups, combining the product of step (1) with a durable press resin represented by the formula:

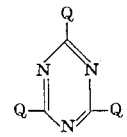

where: Q may be alike or different and equals —$NH_2$,

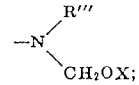

and wherein R''' = hydrogen, alkyl containing one to three carbon atoms, —$CH_2OX$; and X = hydrogen or alkyl containing one to three carbon atoms and (3) heating the combined products of steps (1) and (2) to a temperature of 100° to 500° F.

12. A fibrous material according to claim 10 wherein said fibrous material is a textile fabric comprising cellulosic fibers.

13. A fibrous material according to claim 12 wherein said cellulosic fibers are cotton fibers.

14. A fibrous material according to claim 10 wherein said fibrous material is a textile fabric comprising cellulosic and polyester fibers.

15. A flame retardant textile fabric comprising cotton and polyester fibers produced by a process which comprises treating a textile fabric containing cotton and polyester fibers with a flame retardant amount of the product produced by the step of (1) reacting (a) elemental phosphorous, (b) propylene oxide, and (c) methanol, in the presence of a base catalyst, to produce an organophosphorus composition, wherein said process is carried out at a temperature within the range of from about 25° C. to about 200° C. and thereafter reacting said organophosphorus composition with formaldehyde in proportions, at a temperature, and for a period of time sufficient to convert substantially all phosphinous hydrogen in said organophosphorous composition to hydroxymethyl groups; (2) air oxidizing the resultant product to convert substantially all trivalent phosphorus to pentavalent phosphorus; (3) combining the air oxidized product with a triazine durable press resin containing a methylolated melamine and a urea-based product in aqueous solution and (4) heating the product of step (3) at a temperature of 100° to 500° F.

16. A textile fabric according to claim 15 wherein the durable press resin is hexamethoxymelamine.

17. A textile fabric according to claim 15 wherein the durable press resin is N,N'-dimethoxymethylurea.

18. A fibrous material according to claim 3 wherein said fibrous material is wood.

19. A fibrous material according to claim 3 wherein said fibrous material comprises rayon.

20. A fibrous material according to claim 15 wherein said fibrous material comprises rayon.

* * * * *